United States Patent [19]
Djorup

[11] Patent Number: 5,357,795
[45] Date of Patent: Oct. 25, 1994

[54] ANEMOMETER TRANSDUCER WIND SET

[76] Inventor: Robert S. Djorup, 20 Lovewell Rd., Wellesley, Mass. 02181

[21] Appl. No.: 32,682

[22] Filed: Mar. 17, 1993

[51] Int. Cl.$^5$ .............................. G01W 1/02; G01F 1/68
[52] U.S. Cl. .................................. 73/170.12; 73/204.22
[58] Field of Search ........... 73/170.11, 170.12, 170.14, 73/204.22, 204.24, 204.25

[56] References Cited

U.S. PATENT DOCUMENTS

| | | | |
|---|---|---|---|
| 2,661,624 | 12/1953 | Bechberger et al. | 73/170.12 |
| 2,701,474 | 2/1955 | Goudy | 73/170.14 |
| 2,813,424 | 11/1957 | Liepmann et al. | 73/861.24 |
| 3,352,154 | 11/1967 | Djorup | 73/170.12 |
| 3,768,308 | 10/1973 | Neradka | 73/170.14 |
| 4,703,659 | 11/1987 | Lew | 73/861.24 |
| 4,735,094 | 4/1988 | Marsh | 73/861.24 |
| 4,905,513 | 3/1990 | Burgos | 73/170.12 |

FOREIGN PATENT DOCUMENTS 52100352 6/1982 Japan ................................ 73/170.11

Primary Examiner—Herbert Goldstein
Attorney, Agent, or Firm—Choate, Hall & Stewart

[57] ABSTRACT

An anemometer transducer wind set with no moving parts for determining both wind speed magnitude and wind direction components having an omnidirectional wind speed resultant thermal anemometer transducer and a directional orthogonal or right angle ducted thermal anemometer transducer. Omnidirecitonal single-ended element design configuration is disclosed that is used to control thermal anemometer resultant wind element spatial response to wind flow together with a wind set array configuration that combines the resultant wind measurement transducer with an orthogonal dual component ducted thermal anemometer wind direction sensing transducer.

8 Claims, 4 Drawing Sheets

ANEMOMETER TRANSDUCER WIND SET

TECHNICAL FIELD

This invention relates generally to an improved anemometer transducer apparatus for determining both wind speed and wind direction. The invention discloses a combination wind set wherein an omnidirectional wind speed sensing element is used to make independent wind speed resultant measurements together with a directional orthogonal anemometer transducer that is used to make precision measurements of component wind direction, all with no moving parts.

BACKGROUND ART

The use of electrically self-heated resistors, hot wires, and hot films as thermal anemometer transducers is well known in the prior art. In such devices, a heated resistive element serves as a sensing element, and its physical geometry is used to define its spatial response to impinging airflow. The sensing transducer has a non-zero temperature coefficient of resistance and is maintained at feedback controlled constant resistance. Transducer element pairs are used to determine direction and in some cases they are used to determine both speed and direction.

In a well-executed paired-element directional thermal anemometer, where speed and direction are both differentially read out, advantage is taken of common-mode rejection of unwanted spurious input signals such as those caused by rain, snow, drizzle, fog, salt accretion and the like. Examples of such anemometers are those made in accordance with the teachings of U.S. Pat. Nos. 4,279,147 and 4,794,795.

Earlier directional anemometers such as those taught by U.S. Pat. Nos. 3,352,154, 3,900,819, 4,024,761, and 4,206,638, use single-ended thermal anemometer sensing element pairs where the velocity or speed component is taken as the sum of the element signals with respect to ground, and direction sign sense information is taken as the difference signal between the two elements.

A bounded pipe or conduit enclosed tandem hot wire transducer is disclosed by U.S. Pat. No. 3,677,085 wherein a method for taking electrical differences from transducer side to side is taught.

A somewhat different approach is disclosed by U.S. Pat. No. 3,498,127, wherein an orthogonal set of paired sensing elements is used to drive a cathode ray indicator displaying speed and direction.

An entirely different approach to directional anemometry takes advantage of the wake vortex that is shed from an obstruction or bluff body that is placed in an air stream. When an obstructing strut or bar is placed across a tube, vortices are shed in rapid succession on opposite sides of the obstruction where the vortex frequency is proportional to fluid velocity through the tube. Directivity is determined by the shape of the tube inlet and direction sign sense is determined by which side of the bluff body leads the shed vortex. Customarily, an ultrasonic method is used to detect the shed vortex. Vortex-Shedding meters are briefly described on pages 262–263 in a book entitled "Fluid Mechanics Measurements", edited by Richard J. Goldstein and published in 1983 by Hemisphere Publishing Corporation, New York, ISBN 0-89116-244-5.

Yet another method that has been widely used in directional anemometry takes advantage of the pressure distribution around a circular cylinder, with pairs of opposing pressure ports being used to determine local pressure differences that are a function of cylinder rotation in the flow field. A detailed description of the technique is presented in Chapter V, "Flow Direction Measurements", pages 97–110 in "Aerodynamics Measurements", edited by Robert C. Dean, Jr., Gas Turbine Laboratory, Massachusetts Institute of Technology, published in 1953 by the M.I.T. Press, Cambridge, Mass. Reference is also made to the teachings of U.S. Pat. No. 3,318,153.

Multi-component anemometers are generally used out-of-doors at unattended or isolated locations and are openly exposed to the surrounding environment. In particular, it has been observed that thermal anemometers may accumulate dirt and contamination and their performance can deteriorate unless routine periodic cleaning is employed or naturally occurring rainfall cleanses the anemometer. Often, they are operated where varying amounts of oil fog and unburned hydrocarbon vapors are present, as at airports, offshore drilling and production platforms, near power plants, and near ship and naval vessel exhaust stacks. Regardless of configuration and how thermal element pairs are used, dirt and oil vapor condensate accumulation adversely affects directional anemometer calibration and, in the long term, measured component wind speed will decrease as anemometer sensitivity becomes impaired, while wind direction sensing is little affected. The differential paired-element anemometers, U.S. Pat. Nos. 4,279,147 and 4,794,795, provide a composite wind speed and direction component output and see little if any change in direction sensing precision since dirt and oil accumulation is random, is fairly uniform, and occurs as a common-mode phenomenon. Wind component output is decreased as the elements become coated, while element cosine response is virtually unchanged. The single-ended element pairs, U.S. Pat. Nos. 3,352,154, 3,900,819, 4,024,761, and 4,206,638, will see a more drastic change in sensitivity since their wind speed output is taken as the sum of two sensing element signals for each component.

Historically, the weather services of the World use wind data in polar form (rho-theta) for wind speed and wind direction, and most mechanical and electromechanical wind sets are configured accordingly. Worldwide gathering and transmission of wind data are handled in polar form. For thermal anemometer planar wind measurement, as well as vortex shedding and differential pressure anemometers, two Cartesian components are customarily sensed, indicating North-South and East-West wind, or headwind and crosswind. Generally, wind direction, theta, is determined from two anemometer orthogonal components by computing the arc tangent or arc cotangent function, and the magnitude of the wind resultant, rho, is found by taking the square root of the sum of the squares of the orthogonal wind components.

Allowed patent application Ser. No. 07/568,425 is incorporated by reference to further define background art.

SUMMARY OF THE INVENTION

The present invention provides a significant improvement in the measurement of wind by component anemometer wind sets, accomplished by the incorporation of an independent omnidirectional thermal anemometer transducer element in combination with a component directional transducer pair. The combination array thus provides a high quality resultant wind speed measurement together with a precision wind direction component measurement during adverse operating conditions. The omnidirectional anemometer element is in a form to minimize any influence of dirt, oil fog accumulation, salt accretion, and precipitation, on resultant wind speed measurement precision. Its physical form and construction are optimized to reduce unwanted adverse signal effects.

An omnidirectional thermal anemometer sensing element configuration is disclosed that is used to control spatial response to wind flow outside of the horizontal plane, the principal plane of interest for most meteorological observations. Wind set array embodiments, including an omnidirectional sensing element used together with an orthogonal Vortex-Shedding meter, and an omnidirectional sensing element together with an orthogonal differential pressure anemometer, are disclosed. A further embodiment discloses orthogonal ducting of thermal anemometer sensing element pairs for direction sensing together with an omnidirectional thermal anemometer sensing element for sensing resultant wind speed magnitude.

DESCRIPTION OF THE PREFERRED EMBODIMENT

Figure 1:
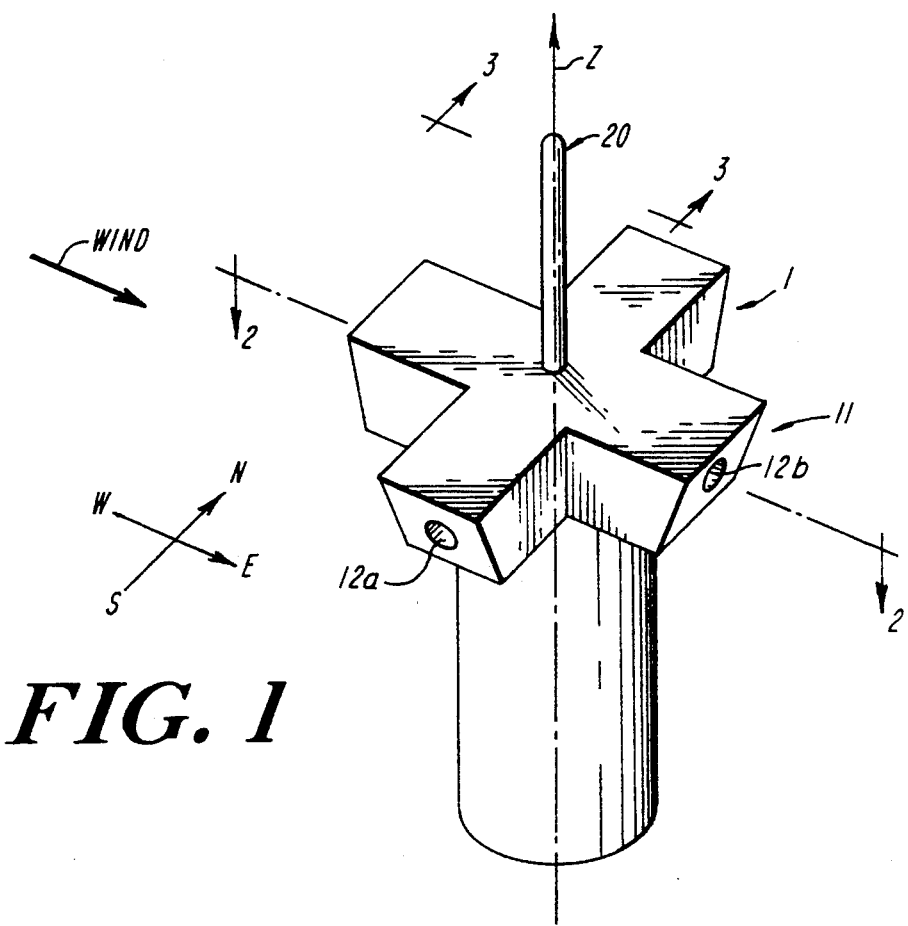
FIG. 1 is a perspective view of an anemometer transducer wind set made in accordance with the principles of the present invention that illustrates an omnidirectional anemometer transducer together with an orthogonal vortex shedding anemometer transducer pair.

Referring now to the drawing, and in particular to FIG. 1, the numeral 1 generally designates an anemometer transducer wind set constructed in accordance with the principles of the present invention. The wind set 1 includes an orthogonal directional vortex-shedding anemometer transducer 11, oriented to be sensitive to wind flow in the horizontal N-S, E-W (North-South, East-West) plane, together with an axially supported omnidirectional thermal anemometer transducer 20 whose longitudinal axis Z is oriented perpendicular to the N-S, E-W plane. The vortex-shedding anemometer transducer 11 includes two identical orthogonal air passage ways, 12a and 12b, that house the active sensing portion. It has been observed in some instruments that duplicate parallel air passages are provided to increase shed vortex path length. Orthogonal components of wind speed are measured by directional anemometer transducer assembly 11 while omnidirectional transducer 20 measures wind speed magnitude.

Figure 2:
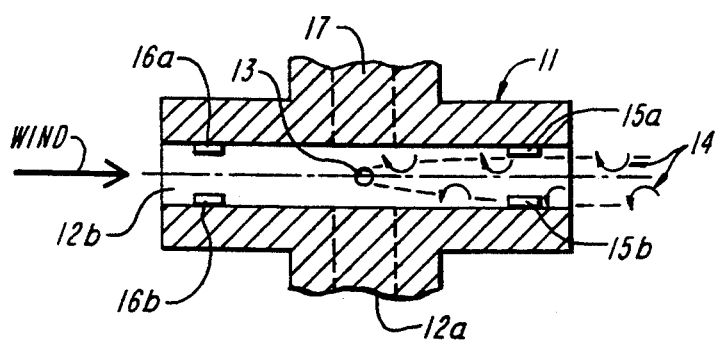
FIG. 2 is a partial elevational section view through the vortex shedding anemometer transducer pair illustrated in FIG. 1, taken along the line 2—2 thereof, and looking in the direction of the arrows, that shows the airway arrangement for one component.

FIG. 2 is a partial elevational section view of the vortex-shedding directional anemometer transducer 11 structure illustrated in FIG. 1, taken along the line 2—2 thereof, and looking in the direction of the arrows. Transducer 11 consists of a housing 17 that contains two perpendicular air passage ways, 12a and 12b, both identical to each other save for their orientation. A strut 13 or bluff body is located at the center of the air passage way and air flow across strut 13 sheds vortex curls 14 in alternation from side to side which are carried by the airstream through passage way 12b and across the face of detectors 15a and 15b. An identical pair of detectors 16a and 16b is positioned at the other end of the air passage way 12b to detect vortex curls 14 shed from strut 13 when the wind reverses direction. Some Vortex-Shedding meters use redundant air passage ways, two per axis. Detectors 15a, 15b, 16a, and 16b are customarily piezo-electric detectors or capacitor plates that electrically sense curl 14 transit across their face. A description of the theoretical basis for vortex shedding or eddy shedding is given on pages 286–289 in "The Measurement of Airflow" by E. Ower and R. C. Pankhurst, fifth edition published in 1977 by Pergamon Press, Oxford, England, ISBN 0-08-0211282-4. A detailed treatment of wakes and vortex generation behind a cylinder is given by Chapter XIII "Wakes", pages 550–586 in the book entitled "Modern Developments in Fluid Dynamics", Vol. II, edited by S. Goldstein, published in 1965 by Dover Publications, Inc., New York, N.Y., Library of Congress Catalog Card Number: 65-15511. Many thousands of Vortex-Shedding meters have been commercially produced by J-TEC Associates, Inc. of Cedar Rapids, Iowa, and are deployed as crosswind sensors on army battle tanks including the U.S. Army M-1 Abrams.

Figure 3:
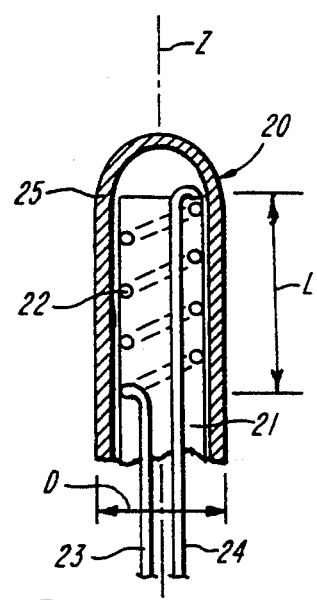
FIG. 3 is a partial elevational section view through the omnidirectional transducer illustrated in FIG. 1, taken along the line 3—3 thereof, and looking in the direction of the arrows, that illustrates construction of a typical transducer element.

FIG. 3 is an elevational section view of the omnidirectional thermal anemometer transducer 20 structure illustrated in FIG. 1, taken along the line 3—3 thereof, and looking in the direction of the arrows. Transducer 20 consists of an electrically nonconductive refractory substrate 21 that is used to support a fine resistance wire helix 22 with attached lead wires 23 and 24 passed through the bottom to facilitate cantilever mounting. Generally a crushable oxide ceramic like MgO (magnesium oxide) is used to provide both electrical insulation and good thermal contact with an outer stainless steel shell 25 that may be swaged down to size, compressing and crushing the wire spiral and insulator. For use as an anemometer transducer a high temperature coefficient of resistance electrical resistance wire such as platinum, pure nickel, or nickel/iron alloy is preferred for wire helix 22. Platinum wire is the most stable but it is also the most costly. Helix 22 is restricted to the region L near the tip of transducer 20 and a platinum helix may typically be about 3.6 ohms at 0° C. The diameter of transducer 20 is shown as D. Transducer 20 response to wind from any direction in the N-S, E--W plane is uniform or omnidirectional and its processed electrical output is r, indicating wind speed resultant magnitude in the N-S, E-W plane. Transducer 20 response to wind away from the N-S, E-W plane may be controlled by adjusting its L/D or length-to-diameter ratio. The outer shell 25 is work hardened during swaging down to size and when a 3 mm or 4 mm diameter transducer 20 is installed so that its shell 25 is seated on a metal shoulder it is resistant to hailstone impact. It is helpful to apply an overall protective layer of Teflon TM to the outer surface of the stainless steel shell 25 in order to take advantage of its well known hydrophobic properties. This will greatly assist in self-cleaning of transducer 20 during prolonged outdoor exposure of wind set 1. The combination of a hydrophobic coating on a smooth vertical cylinder together with naturally occurring rainfall results in a transducer 20 that is least affected by environmental pollution and contamination.

Figure 4:
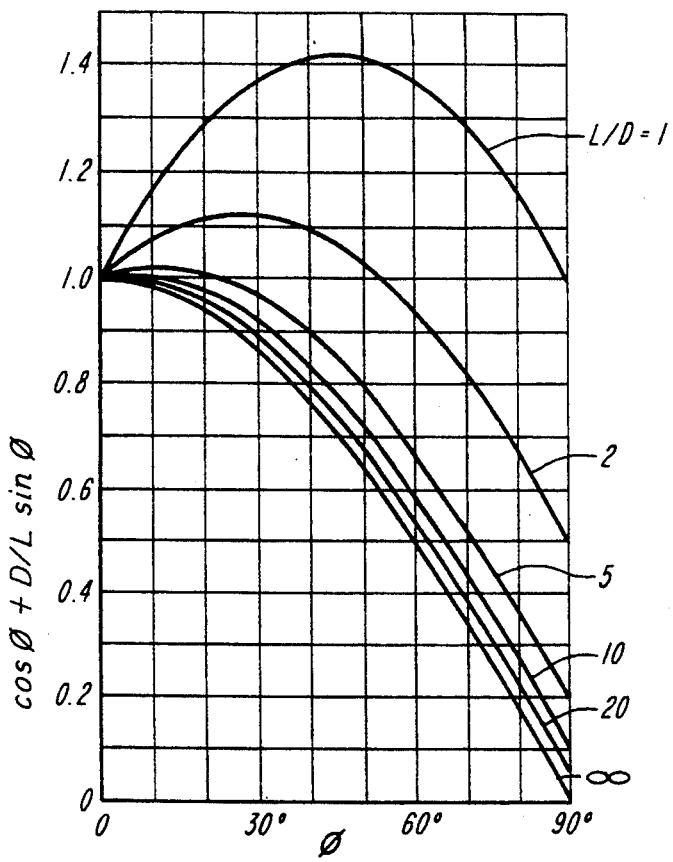
FIG. 4 is a diagram showing the effect of change in the length-to-diameter ratio versus angle-of-attack of spatial flow response for the FIG. 1 omnidirectional anemometer transducer element.

FIG. 4 ia a graph that illustrates the response of transducer 20 to wind flow as it moves out of the horizontal N-S, E-W plane. The graph shows the change in response realized when transducers having different length-to-diameter (L/D) ratios are used. The length L of the active sensing area of transducer 20, illustrated in cross-section by FIG. 3, is internally heated by an electrical current. As a practical matter some stem conduction through the stainless steel wall 25 takes place and it is helpful to add about one diameter to the equivalent length of the active area L. It is useful to control the length of the active area during fabrication in order to define tilt performance of transducer 20. The tilt angle $\phi$ is the angle of incidence or angle-of-attack for impinging wind away from the normal or away from perpendicular to the axis Z of transducer 20. The expression $\cos \phi + D/L \sin \phi$ is derived from the perceived change in overall transducer 20 projected surface area to laminar wind flow as transducer 20 is tilted into the wind. An inspection of the FIG. 4 graph discloses that it is advantageous to use length-to-diameter ratios in the range of 3 to 5 in order to obtain least change in response to vertical component variations or up-slope variations in wind flow. The obverse is equally true, that is, the wind set 1 can be dimensionally configured to be minimally responsive to changes in its mounting attitude that otherwise might adversely affect wind measurement precision. The instrument designer has control of transducer 20 dimensions thereby shaping wind flow spatial response to suit his measurement application for wind set 1. When an L/D ratio in the range of 3 to 5 is used, the omnidirectional transducer 20 will tolerate large angles of tilt without appreciable change in output. A larger value of L/D ratio will cause transducer 20 relative response to wind flow away from the horizontal plane to approach a cosine function. A practical limit on L/D ratio is determined by material strength, and is in the range of 10 to 20, beyond which further length increases become impractical. As sensing transducer 20 is operated at an elevated temperature it is self-deicing and is also able to operate from a cold start during severe icing events since the entire cantilever structure of transducer 20 becomes hot. Consideration of FIG. 4 discloses that, for example, the following output variations may be predicted for transducer 20 that is fabricated to the listed L/D ratios for the indicated ranges of angle-of-attack or angle-of-incidence, $\phi$.

| L/D | $\phi$ | Output Variation |
| --- | --- | --- |
| 3 | ±45° | ±6% |
| 4 | ±33° | ±3% |
| 4.5 | ±30° | ±2.4% |
| 5 | ±27° | ±2% |
| 6 | ±22.5° | ±1.4% |

Figure 5:
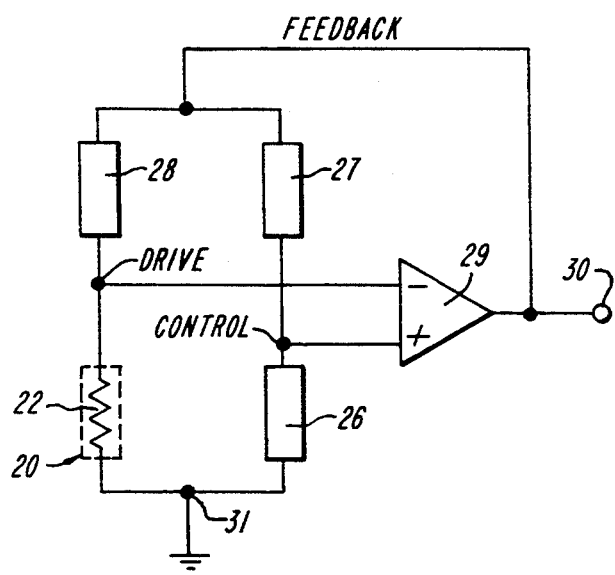
FIG. 5 is an electrical circuit schematic that may be used to operate a FIG. 1 omnidirectional anemometer transducer element.

An example of a constant temperature anemometer electrical circuit that may be used to operate omnidirectional thermal anemometer transducer 20 is given by FIG. 5. Transducer 20 has a high temperature coefficient of resistance and is maintained at constant resistance and, thus, constant temperature while it is operated as part of a feedback controlled electrical bridge circuit. Omnidirectional transducer 20, with its wire wound resistance helix spiral 22 forms one arm of a four arm Wheatstone bridge which is completed by resistances 26, 27 and 28. Differential amplifier 29 is connected to the bridge at the drive and control points in order to determine bridge balance or bridge error signal and amplifier 29 output 30 is fed back to the bridge in order to provide bridge excitation with heating current to transducer 20 resistance 22. For clarity's sake power supply connections are not shown in this figure. Resistor 28 is a low temperature coefficient power resistor that passes the full transducer 20 heating current. Resistor 26 is a temperature sensor exposed to the ambient environment. It has a temperature coefficient of resistance that is the same as that of resistance 22 so that ambient temperature tracking during operation is used to adjust the overheat operating temperature of transducer 20 as ambient temperature changes occur. Resistance 22 is operated at a constant elevated temperature above sensed ambient temperature thus assuring constant operating sensitivity for transducer 20. The remaining bridge circuit arm comprises the resistor 27 which has a value selected to establish bridge balance at the desired overheat operating temperature of the self-heated transducer 20 element 22. The output 30 is a non-linear signal and it contains a constant term which is the zero flow heating signal, a fourth root term as a function of wind speed, and a turbulence component that results from fluctuations in the flow term.

In a typical FIG. 5 constant temperature anemometer bridge circuit, sensing element resistance 22 is 3.6 ohms at 0° Centigrade, and with a temperature coefficient of 3,900 parts per million per degree Centigrade a temperature rise of 100° Centigrade brings the resistance value to about 5 ohms when platinum wire is used. Low temperature coefficient power resistor 28 is 2 ohms. Resistor 26, used for temperature compensation, has the same temperature coefficient as element resistance 22 and is 500 ohms at 0° Centigrade. Resistor 27 is used to set the bridge operating level and 200 ohms causes the bridge to balance when sensing element resistance 22 rises to 5 ohms upon turn on of the circuit. An alternative way to configure the bridge operating circuit is taught by U.S. Pat. No. 5,069,066, wherein double bridge operation is disclosed.

Figure 6:
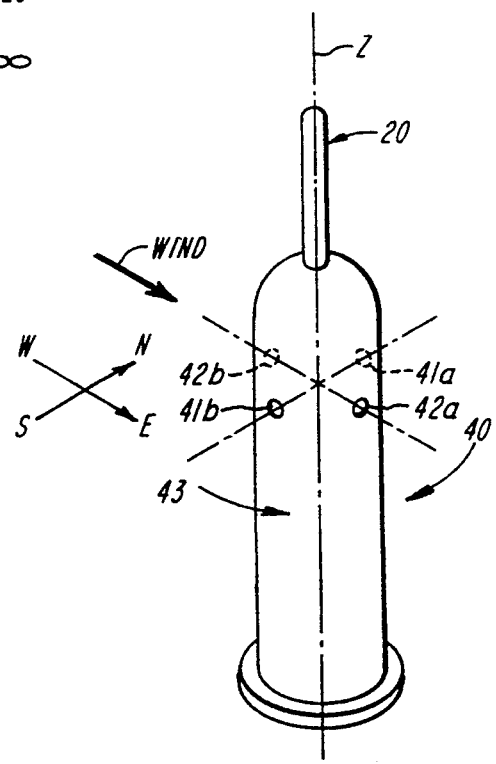
FIG. 6 is a perspective view of an anemometer transducer wind set made in accordance with the principles of the present invention that illustrates an omnidirectional anemometer transducer together with an orthogonal differential pressure anemometer.

FIG. 6 is a perspective view of a second embodiment of an anemometer transducer wind set 40 constructed in accordance with the principles of the present invention. The wind set 40 includes an orthogonal differential pressure directional anemometer 43 together with an axially supported omnidirectional thermal anemometer transducer 20 whose longitudinal axis Z is oriented perpendicular to the N-S, E-W plane. The differential pressure anemometer 43 senses pressures related to wind speed components at surface located pressure ports 41a and 41b for one component and at 42a and 42b for the other component. Anemometer 43 body is a circular cylinder that is vertically positioned with its longitudinal axis Z perpendicular to the flow plane. The principle of operation is such that the pressure difference outputs are proportional to both the flow angle and dynamic pressure. One set of pressure sensing ports, 41a and 41b, is set up in the North-South direction, and the other set, 42a and 42b, is in the East-West direction. Differential pressure transducers of this type have been commercially produced by Rosemount, Inc. (presently by Campbell Scientific, Inc.), identified as their Model 874BN Orthogonal Anemometer. A complete operating description is presented in their Product Data Sheet 2485.

Differential pressure anemometers and airspeed sensors such as pitot-static tubes follow a square law pressure response, with high sensitivity at high wind speeds and poor sensitivity at low wind speeds. Thermal anemometers follow a fourth root response as wind speed increases and they exhibit very high sensitivity at low wind speeds and lower sensitivity at high wind speeds. Use of an axial thermal anemometer transducer 20 in wind set 40 takes the wind speed operating range down to zero wind speed and eliminates any need to compute wind resultant magnitude from pressure difference derived wind speed components where differential pressure measurements are least reliable. In the community of meteorological users a need for high precision at lowest wind speeds for direction is of lower priority than their need to know wind speeds at or near thresholds approaching zero wind. Such requirements are most often associated with pollution and diffusion observations. A particular advantage in using the FIG. 6 wind set becomes clear during very severe icing conditions that exist at mountain observing stations, in the Arctic, and at cold wet locations.

Figure 7:
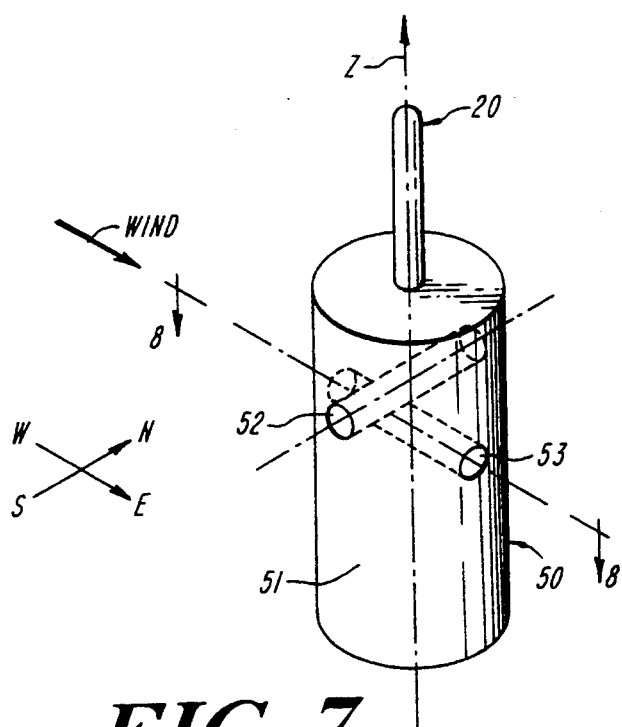
FIG. 7 is a perspective view of an anemometer transducer wind set made in accordance with the principles of the present invention that illustrates an omnidirectional anemometer transducer together with an orthogonal ducted thermal anemometer.

FIG. 7 is a perspective view of a third embodiment of an anemometer transducer wind set 50 constructed in accordance with the principles of the present invention. Wind set 50 includes an orthogonal ducted thermal anemometer 51 together with an axially supported omnidirectional thermal anemometer transducer 20 whose longitudinal axis Z is oriented perpendicular to the N-S, E-W plane of dominant wind flow. The body of the ducted thermal anemometer is shown as a circular cylinder 51 with two similarly sized orthogonally oriented ducts 52 and 53 through the cylinder and with their axes parallel to the N-S, E–W plane. In its simplest form cylinder 51 supports ducts 52 and 53 as an open cross, extending beyond cylinder wall 51. Direction sensing is accomplished by determining air flow through ducts 52 and 53 as wind set 50 is rotated about its axis Z with respect to incident wind flow against the cylinder 51. Since both omnidirectional transducer 20 and orthogonal directional transducer 51 are thermal anemometers they demonstrate similar response to flow throughout their operating range from zero wind speed to maximum wind speed.

Figure 8:
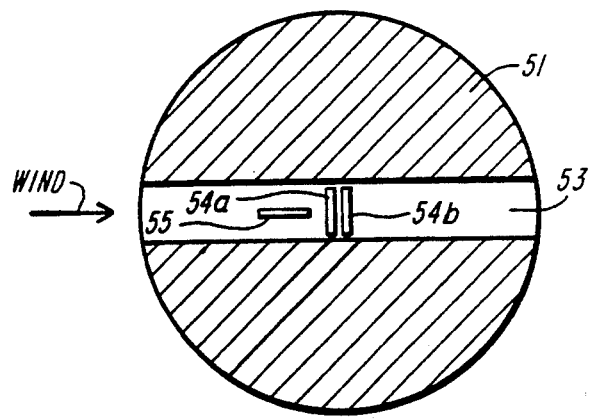
FIG. 8 is an elevational section view through the orthogonal ducted thermal anemometer illustrated in FIG. 7, taken along the line 8—8 thereof, and looking in the direction of the arrows, that shows the construction of the airway for one component.

FIG. 8 is an elevational section view of the orthogonal ducted thermal anemometer 51 structure illustrated in FIG. 7, taken along the line 8—8 thereof, and looking in the direction of the arrows. The circular cylindrical body 51 is shown pierced through by duct 53, open to view. Duct 52 which is at right angles to and over duct 53 is not shown. A pair of thermal anemometer sensing elements, 54a and 54b, is located at the center of and perpendicular to duct 53 with air flow across the pair. Temperature compensating sensing resistor 55 is also positioned in the duct 53 so that it does not impede flow. If resistor 55 is small enough it can be located directly below elements 54a and 54b at the duct midpoint. Duct 52 is identically fitted with a sensing element pair, 54a and 54b, as well as a temperature compensating sensing resistor 55. Ducts 52 and 53 are shown as circular in cross-section in FIG. 7. It should be noted that a square or rectangular duct may be used to advantage, particularly for low angle flow that is the condition when the duct 52 or 53 inlet is almost 90 degrees away from incident wind flow. As wind set 50 is rotated about its Z axis, or as wind changes direction with respect to wind set 50, a round duct passed through a circular cylinder wall does not exactly follow a cosine law respecting its inlet projected area exposed to incident wind. The entire inlet is not in a single plane and "wraps" itself around the surface of the circular cylinder body 51. The duct 53 inlet width or chord, as seen from above, subtends an arc thereby bending the duct inlet around the surface of circular cylindrical body 51. Simply put, the inlet is not flat across its face. A square or rectangular cross-section duct is always defined since the top and bottom edges are parallel to the rotational plane, the N-S, E-W plane, and the vertical edge size and position is precisely defined, in projection, for all rotational angles. If cylindrical body 51 is rectangular or is square in cross-section, the intersection of ducts 52 and 53 with the outer surface at the inlet lies in one vertical plane without "wrap" as above. Minute deviations in projected inlet geometry can exhibit significant effects on the polar response of orthogonal ducted thermal anemometer 51, or any ducted anemometer.

Figure 9:
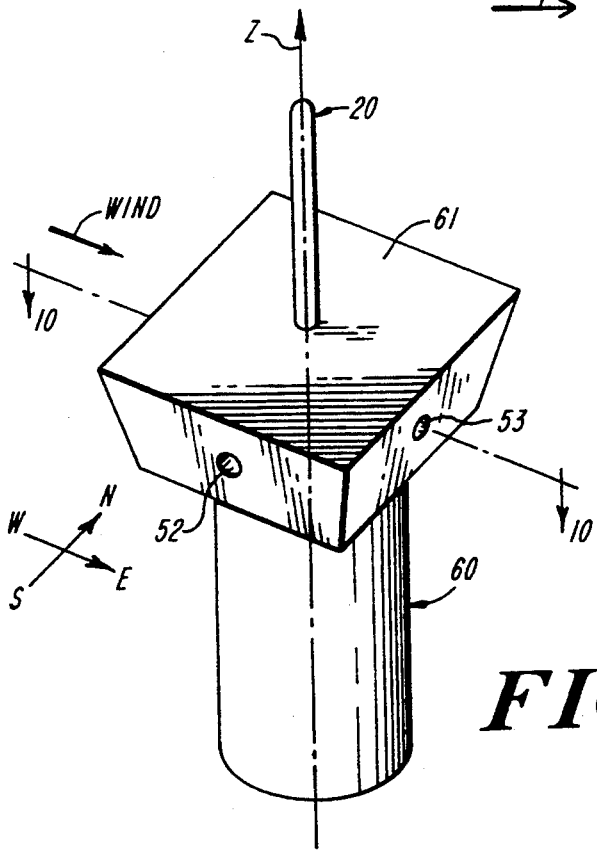
FIG. 9 is a perspective view of an anemometer transducer wind set made in accordance with the principles of the present invention that illustrates an alternative form of the FIG. 7 ducted thermal anemometer.

FIG. 9 is a perspective view of a fourth embodiment of an anemometer transducer wind set 60 constructed in accordance with the principles of the present invention. The wind set 60 includes an orthogonal ducted thermal anemometer 61 together with an axially supported omnidirectional thermal anemometer transducer 20 whose longitudinal axis Z is oriented perpendicular to the N-S, E-W plane of dominant incident wind flow. The body of the ducted thermal anemometer 61 is shown as a square cross-section truncated inverted four-sided pyramid with two identical orthogonally oriented ducts 52 and 53 through the body 61, and with their axes parallel to the N-S, E-W plane. Direction sensing is accomplished as disclosed above under the descriptions of FIG. 7 and FIG. 8.

Figure 10:
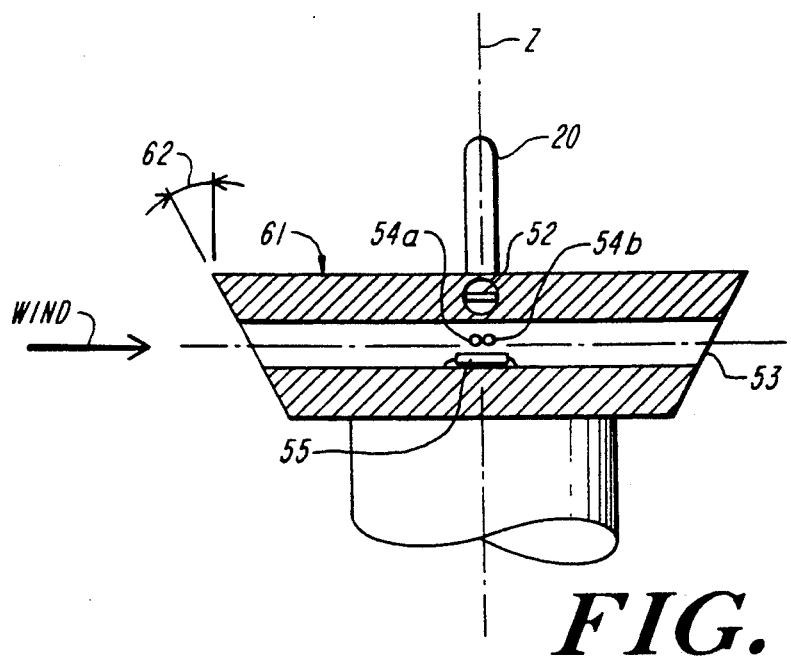
FIG. 10 is a partial elevational section view through the orthogonal ducted thermal anemometer illustrated in FIG. 9, taken along the line 10—10 thereof, and looking in the direction of the arrows, that shows a different inlet face configuration.

FIG. 10 is a partial elevational section view of the orthogonal ducted thermal anemometer 61 structure, part of wind set 60, illustrated in FIG. 9, taken along the line 10—10 thereof, and looking in the direction of the arrows. The directional anemometer head 61 is shown with bevelled inlet faces and the bevel angle 62 is typically 15 to 20 degrees off the vertical to the N-S, E-W plane. If no bevel is provided, direct impinging wind flow against the flat plate that is perpendicular to the flow presents indeterminate random separation for flow in all directions. When the plate is at an angle 62 downward to mean flow, that flow is directed downwards, as in our example. This removes the bulk of random uncertain flow, particularly at low speeds, and improves directional response of transducer 61. When such a configuration is used the duct cross-section can be either square or circular without any difference in performance since the inlet geometry is always defined for all attitudes. The inlet occupies a plane. The pair of thermal directional anemometer sensing elements 54a and 54b is shown above temperature compensating resistor 55 at the center of duct 53. Perpendicular duct 52 is shown above duct 53 although it can also be located below. Generally, the ducts 52 and 53 are from 8 to 13 mm diameter so that they can accommodate the needed sensing elements. It is not appropriate to substantially reduce their cross-section size since flow resistance through ducts 52 and 53 will increase as a result, and adverse viscosity effects as well as boundary layer growth can contribute to flow blocking as speeds increase. The duct flow resistance should be low so that the magnitude of pressure reversals in cylinder 51 boundary layer, referring to FIG. 7, beyond the cylinder critical angle is small compared to the flow induced velocity pressure or impact pressure through the duct at large angles away from impinging flow, near 90°. This is necessary in order to assure direction measurement precision for all angles. Cylinder critical angle loses significance in respect to the square cross-section of the FIG. 9 head 61. A helpful review of relevant pressure measurement, useful when considering flow distribution and pressure taps (duct inlets), is presented by Chapter 16 "Pressure Measurement in Moving Fluids", pages 233-252 in the book entitled "Fundamentals of Temperature, Pressure, and Flow Measurements" by Robert P. Benedict, published by John Wiley & Sons, Inc., New York, in 1969, Library of Congress Catalog Card Number 68-9244 SBN 471 06560 X. FIGS. 16.8 through 16.10 are particularly useful.

Typical head size for the FIG. 9 directional transducer 61 is 60 to 75 millimeters on edge and the FIG. 7 directional transducer 51 body size can typically be 50 millimeters diameter. Body sizes in this range are more than adequate to enclose all required electronics circuits for sensing element drive and signal conditioning of output signals. The entire mechanical structure can be fabricated from stainless steel or anodized aluminum alloy, paying careful attention to electrical bonding of all parts for lightning protection. The described wind set embodiments are all highly resistant, if not immune, to hailstone impact. Wind driven precipitation, rain and snow, will have little if any effect on the duct mounted directional anemometer sensors and detectors since they are protected. Any water will be driven through along the bottom of the duct passage ways, below any sensing elements. Deicing heating can easily be incorporated within the head structure. The wind speed transducer, omnidirectional thermal anemometer transducer 20 is self-deicing as has been above described.

Figure 11:
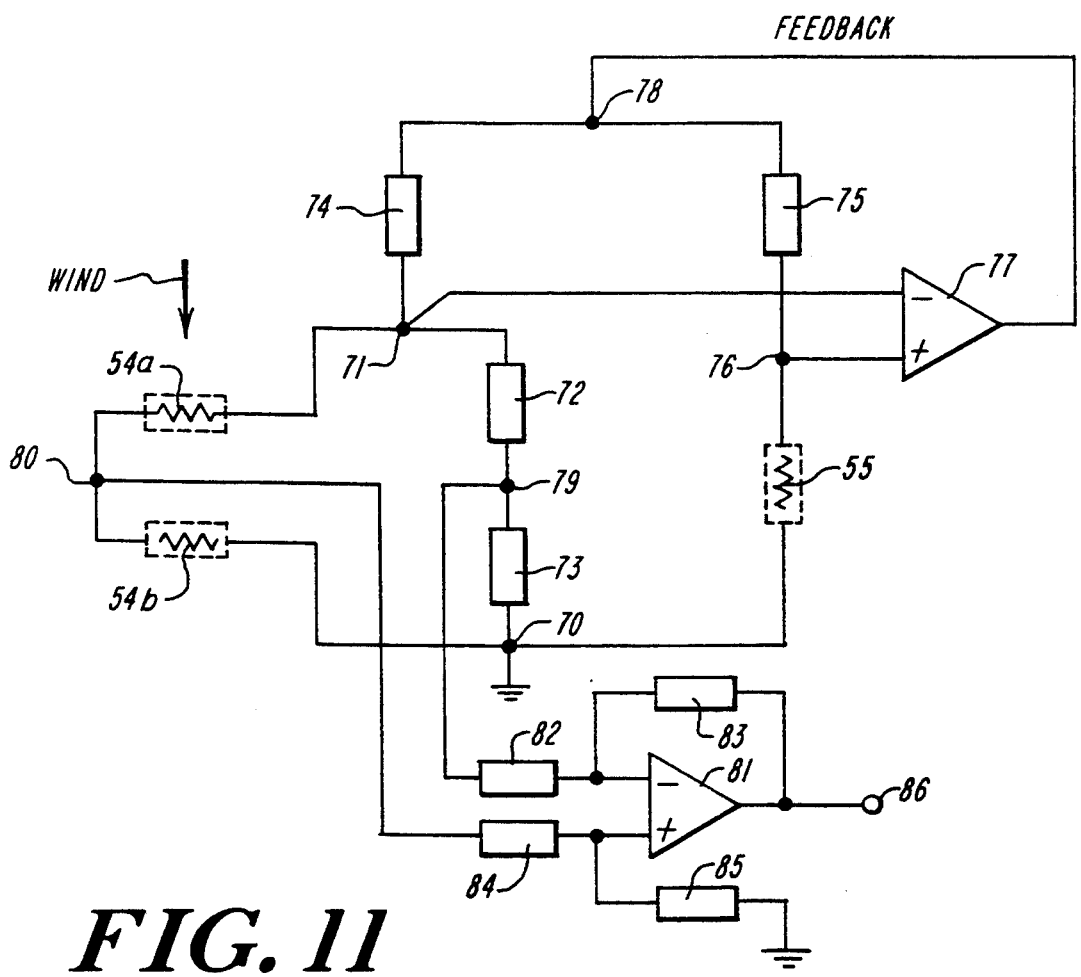
FIG. 11 is an electrical circuit schematic that may be used to operate a FIG. 7 or FIG. 9 orthogonal ducted thermal anemometer component transducer.

FIG. 11 is a simplified electrical schematic drawing illustrating analog excitation and readout means for a thermal anemometer sensing element pair, 54a and 54b, used by the FIG. 7 and FIG. 9 orthogonal ducted thermal anemometer, 51 and 61, respectively. A single composite flow direction and velocity signal 86 is provided. The direction sensing pair of elements 54a and 54b is shown connected as two arms of a four arm Wheatstone bridge which is completed by resistors 72 and 73. The resistors 72 and 73 are used to balance the bridge when the air surrounding the transducer is at rest or at zero wind speed. Excitation for the transducer bridge of FIG. 11, resistors 54a, 54b, 72, and 73, is provided at connections 70 and 71, and bridge balance between points 79 and 80 is detected and is amplified by a differential amplifier 81, thereby providing a signal 86 which is a measure of the degree of balance or imbalance of the transducer bridge. The signal 86 shows imbalance by swinging to either positive or negative polarity when one or the other of the paired sensing elements 54a or 54b is ventilated at greater speed by impinging air flow. The leeward or "down wind" element will "see" a lesser flow speed because of the blocking which is caused by the other or "up wind" element. It should be observed that no air gap can exist between the elements and silicone rubber adhesive or similar material can be used to effect closure. The magnitude of the resulting differential output signal 86 is a direct measure of wind component speed. Resistors 82 and 84 are the input resistors to amplifier 81 and resistors 83 and 85 are the feedback resistors. Differential gain is set by the ratio of feedback resistors 83 and 85, respectively, to input resistors 82 and 84. Typical amplifier stage gain is in the range of thirty to fifty for full scale wind speed of, for example, 25 meters per second.

The bridge formed by the resistors 72 and 73, together with the pair of sensing elements, 54a and 54b, can be considered electrically to be a single resistor that in turn becomes one arm of a second Wheatstone bridge, formed also by a power resistor 74 in series with the first Wheatstone bridge, or transducer direction bridge, and by resistors 75 and 55 which are used to balance the second bridge at an operating level determined by the values of resistors 75 and 55. This allows operator selection of operating point and instrument sensitivity. Amplifier 77 is a differential amplifier that has a high current output which is fed back in closed loop fashion to the bridge at point 78. The input to amplifier 77 is taken across the bridge at points 71 and 76, and attention must be paid to phasing, in order to assure that negative feedback is used.

When the sensing elements 54a and 54b are cold or are nonoperating, their resistance is lower than their normal operating value. Sensing elements 54a and 54b are in fact non-zero temperature coefficient resistors, and a high positive value is preferred. Wire wound or film resistors of platinum, pure nickel, or nickel-iron alloy, are well suited for use as sensing elements 54a and 54b. Nickel has the highest temperature coefficient and platinum is the most stable, but costly, while nickel-iron is the most economical. Since sensing elements 54a and 54b are operated within a duct, with flow always perpendicular to the elements, there is no need to be concerned about length-to-diameter ratios, uniformity of resistance distribution along element length, and similar factors that are important when open elements are to be used in free field flow. U.S. Pat. Nos. 3,677,085 and 3,900,819 also disclose element types that can be used in ducted flow. Since elements 54a and 54b are high temperature coefficient resistors, they permit the setting of the values of resistors 75 and 55 so that resistance values required for bridge balance are satisfied when the total series-parallel resistance of the transducer bridge, taken as a single resistor, together with power resistor 74, both balance against resistors 75 and 55 by having the same resistance ratios on either side of the bridge. The active side is composed of resistor 74 together with the transducer bridge. The reference side is composed of resistors 75 and 55.

The feedback loop operates to automatically adjust the current through the total bridge combination until the resistance of sensing elements 54a and 54b attains that value of resistance which balances the bridge. A small offset voltage must be present at the output of amplifier 77 when the circuit is first turned on, and the elements are at ambient temperature, so that the minute bridge current that flows as a result of the offset voltage is sufficient to develop a small error signal between points 71 and 76, thus permitting the circuit to turn itself on to an operating condition. The aforedescribed mode of operation has been described as a constant temperature (constant resistance) method of hot wire or hot film anemometer operation.

In a typical circuit, the resistance of each of the sensing elements 54a and 54b is 3.6 ohms at 0° Centigrade and the use of platinum wire is assumed. The power resistor 74 is 2 ohms, and it has a low temperature coefficient of resistance, and adequate physical size, so that self-heating does not cause appreciable change in its nominal resistance value with varying current levels. Resistor 75 is 100 ohms and may be a precision metal film or wire wound resistor. Values of resistors 72 and 73 are 20,000 to 50,000 ohms each, to avoid needless loading of sensing elements 54a and 54b. Resistor 55 is used to temperature compensate the element pair 54a and 54b by sensing ambient temperature. It is made of the same material as the sensing elements 54a and 54b, platinum with a temperature coefficient of 3,900 parts per million per degree Centigrade, in order to assure temperature tracking. When resistor 55 is 500 ohms at 0° Centigrade, the elements 54a and 54b will rise to an operating resistance of 5 ohms each for a total resistance of 10 ohms immediately upon application of power to the circuit. For the sake of simplicity, power connections to the FIG. 11 circuit are not shown.

INDUSTRIAL APPLICABILITY

A significant advantage of the disclosed anemometer transducer wind set of the present invention is that, with no moving parts, it is sensitive down to near zero flow, a significantly lower performance threshold than the mile per hour or greater for the best conventional newly-manufactured cup and vane wind sets, propeller anemometers, and virtually all other mechanical and electromechanical wind sets. It is far less complex and much lower in cost than research wind sets such as acoustic anemometers and laser anemometers. The disclosed wind set is particularly well suited to low speed pollution diffusion applications as at power plants, nuclear complexes, chemical and petrochemical manufacturing complexes, wind alert and remote observing stations around airports, airport runway wake vortex alarms, and similar difficult broad dynamic range applications where responsive threshold wind determinations are equally as important as high speed measurement precision and instrument endurance. The ability to make accurate threshold measurements is enhanced by the disclosed wind set's equal responsiveness to extremely high wind speeds, in excess of hurricane velocities and even in the range of tornadic winds. The disclosed wind set is equally useful in more conventional meteorological applications at weather stations, on shipboard, and on off-shore platforms.

It is therefore to be understood that, within the scope of the appended claims, the invention may be practiced otherwise than as specifically described.

What is claimed is:

1. A directional orthogonal dual component ducted thermal anemometer transducer comprising:
   a cylindrical support body through which is radially passed an orthogonal pair of open cylindrical ducts;
   said ducts housing at their mid-point a transverse pair of thermal anemometer resistive sensing elements mounted side-by-side, wherein a plane defined by said sensing element axes is parallel to the longitudinal axis of said open duct;
   said longitudinal axes of said ducts being parallel to the plane of wind flow response and perpendicular to the axis of said cylindrical support body;
   said thermal anemometer sensing elements being provided with electrical connection means, whereby said anemometer sensing elements are self-heated by an electric current passes through said sensing elements, and
   mechanical structure supporting said sensing elements, all mounted within said ducts, each with respect to the other.

2. The directional orthogonal dual component ducted thermal anemometer transducer as defined in claim 1, wherein said cylindrical support body is an inverted truncated four-sided pyramid having a square cross-section in said plane of wind flow response.

3. The directional orthogonal dual component ducted thermal anemometer transducer as defined in claim 1, wherein said cylindrical support body is a square cylinder.

4. The directional orthogonal dual component ducted thermal anemometer transducer as defined in claim 1, wherein said orthogonal ducts are circular in cross-section.

5. The directional orthogonal dual component ducted thermal anemometer transducer as defined in claim 1, wherein said orthogonal ducts are rectangular in cross-section.

6. The directional orthogonal dual component ducted thermal anemometer transducer as defined in claim 1, wherein said open cylindrical ducts extend from said support body in the form of a cross.

7. The directional orthogonal dual component ducted thermal anemometer transducer as defined in claim 1, wherein said ducts each house temperature compensating resistive sensor means mounted near said anemometer sensing elements.

8. The directional orthogonal dual component ducted thermal anemometer transducer as defined in claim 1, wherein a cylindrical thermal anemometer resistive sensing element, having a length greater than its diameter, is axially mounted on said support body with its axis perpendicular to said pair of open cylindrical ducts, said resistive sensing element being provided with electrical connection means, whereby said resistive sensing element is self-heated by an electrical current passed through said sensing element.

* * * * *